United States Patent [19]

Peterson

[11] Patent Number: 5,379,548
[45] Date of Patent: Jan. 10, 1995

[54] SYSTEM FOR SUPPORTING AND WATERING PLANT POTS

[76] Inventor: Mary K. Peterson, 261 Millington La., Hartland, Wis. 53209-1608

[21] Appl. No.: 91,350

[22] Filed: Jul. 14, 1993

[51] Int. Cl.⁶ ............................................ A01G 25/00
[52] U.S. Cl. ........................................ 47/81; 248/558
[58] Field of Search ............... 47/81, 79; 248/165, 248/558 X

[56] References Cited

U.S. PATENT DOCUMENTS

| | | | |
|---|---|---|---|
| 2,081,337 | 5/1937 | Lockyer | 47/81 |
| 2,993,300 | 7/1961 | Sawyer | 47/81 |
| 4,339,891 | 7/1982 | Bassett . | |
| 4,532,910 | 8/1985 | Longley | 248/165 |
| 4,785,604 | 11/1988 | Johnson | 52/668 |
| 4,965,963 | 10/1990 | Lyon | 47/81 |

Primary Examiner—Henry E. Raduazo
Attorney, Agent, or Firm—Godfrey & Kahn

[57] ABSTRACT

A system (36) for supporting and watering plant pots comprises a plurality of panels (10), a container (36), and a wick (46). The panel (10) is planar in shape and has a rectangular boundary (16) which includes a first linear edge (18) and a second linear edge (20) which is parallel to the first linear edge (18). A first notch (26) extends inward from the first linear edge (18), and second and third notches (28) and (30) respectively extend inward from the second linear edge (20). The notches (26, 28 and 30) are substantially uniformly sized such that notches from the panel (10) may be interfitted with notches from a like panel. The interfitting of a plurality of panels in any number of different desired configurations results in the formation of a free-standing support (32) having interstices (34) therebetween. The support (32) is placed between the container (36) and a plant pot (44). A wick (46) is routed between a water reservoir in the container (36) and the pot (44) to feed the pot (44) by capillary action.

11 Claims, 2 Drawing Sheets

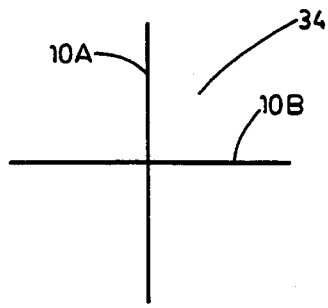
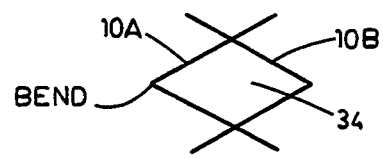
FIG. 3
FIG. 4
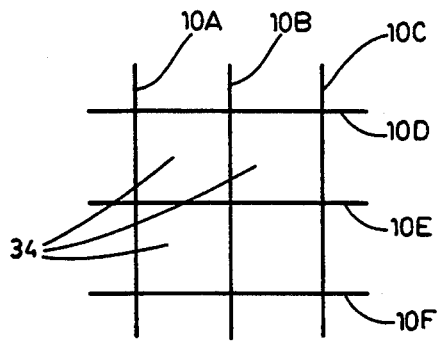
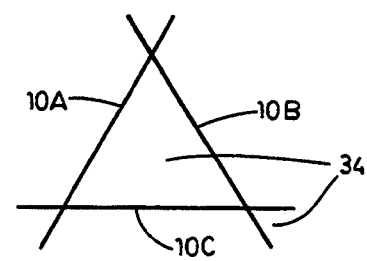
FIG. 5
FIG. 6
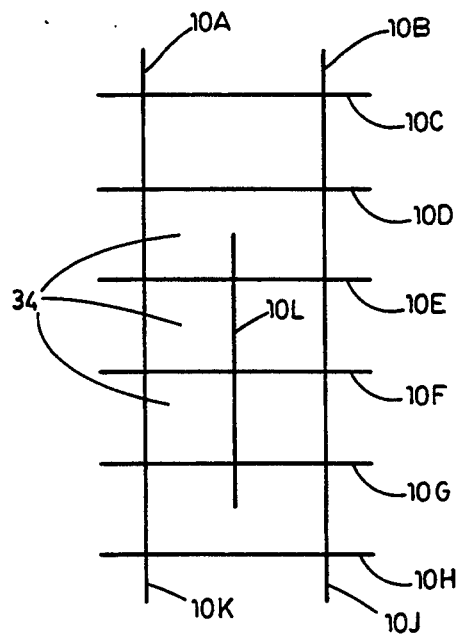
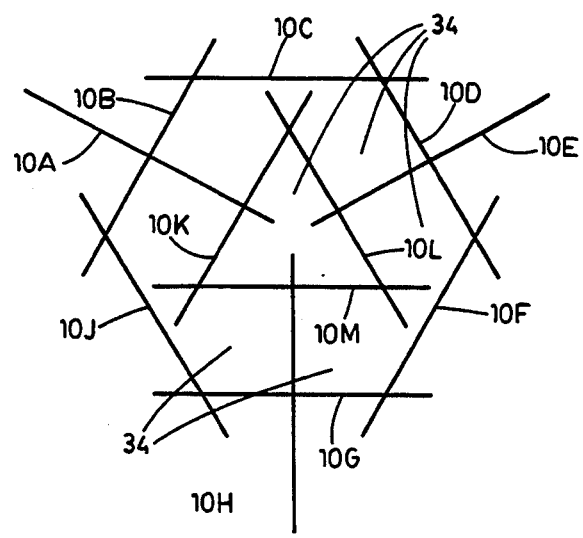
FIG. 7
FIG. 8

SYSTEM FOR SUPPORTING AND WATERING PLANT POTS

FIELD OF THE INVENTION

This invention relates generally to plant irrigation systems, and more particularly to an irrigation system which operates by capillary action.

BACKGROUND OF THE INVENTION

Plant irrigation systems provide a means of watering a potted plant without continual attention. Such plant irrigation systems typically include a container in which a water reservoir is held, a pot with a live plant potted therein, and a support which rests within the container and upon which the pot is placed, the support acting as a spacer such that the pot itself is not resting in the standing water. A wick is then routed from the water reservoir to the pot in order to water the plant within the pot by capillary action.

Supports used in plant irrigation systems of the prior art are characterized by certain drawbacks. For example, the supports of the prior art lack durability and have a limited life span when used with heavier types of plants and trees. The prior art supports are not necessarily sized to fit within the containers, which creates instability of the support within the container, causing the supports to move around and increase the chance of collapse, especially when the plants are being moved. Generally, the supports of the prior art are not variable in size to adapt to different sized containers or plant pots. Corrugated materials, or materials having irregular surfaces, which are used in prior art supports such as in U.S. Pat. No. 4,965,962 issued to Lyon, trap unwanted debris, are difficult to clean, and result in the creation of foul smells. The prior art supports are limited to a low number of contact points with the pot, which limits the strength and stability. Finally, the supports of the prior art may not provide ease of access to the water reservoir to check water levels.

Accordingly, a need has arisen for a system for supporting and watering plant pots which avoids the above-named drawbacks without compromising its intended purpose.

SUMMARY OF THE INVENTION

In accordance with the present invention, a free-standing support for a plant pot includes a plurality of water-impervious panels, each of the panels having a first planar surface, a second planar surface that opposes the first planar surface, and a boundary about the planar surfaces. The boundary about the planar surfaces includes a first linear edge, and a second linear edge which is parallel to the first linear edge. The panels each include a first notch which extends inwardly from the first linear edge and second and third notches which extend inwardly from the second linear edge, the notches being substantially uniformly sized and normal to the longitudinal access of the panel such that one panel may be interfitted with another by mating notches from the different panels and the support is built by interlocking a desired number of panels to create a pattern of panels having interstices therebetween which is large enough to fit under the plant pot.

The free-standing support may be part of a greater system which includes a container and a wick. The container has bottom and side walls for holding water and the support is placed between the bottom wall of the container and the plant pot. The wick extends between one of the interstices formed between the pattern of panels and the plant pot to convey water by capillary action to the plant pot when the container has been filled with water.

The panels may be constructed in a number of different configurations to support different sized plant pots or to fit within different sized containers. The panels are formed of a high density plastic such as polypropylene or polyethylene, and are smooth, water-impervious, durable and flexible. The flexibility of the panels aids in the assembly of the free-standing supports, and the panels may even be in a flexed state when the support has been built. The supports created by the interlocking panels are themselves durable and provide a stable support for the plant pots when filled with dirt and potted. The system of the present invention further provides ease of access to check water levels contained within the container.

It is an object of the present invention to provide a stronger, sturdier and higher quality means of a system for supporting and watering plant pots, which significantly enhances the function and performance beyond that depicted in the prior art.

It is a further object of the present invention to provide a system for supporting and watering plant pots which is characterized by greater versatility and flexibility by its superior interfitting capability to enhance plant support.

It is a further object of the present invention to provide a system for supporting and watering plant pots which includes a free-standing support having more points of contact when the panels are assembled, thus making it a stronger, sturdier system than that depicted in the prior art.

It is a further object of the present invention to provide a support which fits securely together upon assembly.

It is a further object of the present invention to provide a system for supporting and watering plant pots which is easy to assemble and disassemble.

It is a further object of the present invention to provide a system for supporting and water plant pots which accommodates different sized containers or plant pots by the addition or subtraction of panels.

It is a further object of the present invention to provide a system for supporting and watering plant pots which provides for compact storage when the panels are disassembled.

It is a further object of the present invention to provide a system for supporting and watering plant pots which includes panels having smooth surfaces to provide for ease of cleaning and to prevent the trapping of unwanted debris which could otherwise cause foul smells.

It is a further object of the present invention to provide a system for supporting and watering plant pots in which the panels are reusable.

It is an object of the present invention to provide a system for supporting and watering plant pots in which the panels may be assembled to create a pattern of interstices and which thereby provides a ready means of filling the container with water and creating a plant reservoir.

Further objects, features and advantages of the invention will be apparent from the following detailed description when taken in conjunction with the accompanying drawings.

BRIEF DESCRIPTION OF THE DRAWINGS

In the drawings:

FIG. 3 is an illustrative example of a first configuration of panels which form the free-standing support of the system for supporting and watering plant pots.

FIG. 4 is an illustrative example of a second configuration of panels which form the free-standing support of the system for supporting and watering plant pots.

FIG. 5 is an illustrative example of a third configuration of panels which form the free-standing support of the system for supporting and watering plant pots.

FIG. 6 is an illustrative example of a fourth configuration of panels which form the free-standing support of the system for supporting and watering plant pots.

FIG. 7 is an illustrative example of a fifth configuration of panels which form the free-standing support of the system for supporting and watering plant pots.

FIG. 8 is an illustrative example of a sixth configuration of panels which form the free-standing support of the system for supporting and watering plant pots.

DETAILED DESCRIPTION OF THE PREFERRED EMBODIMENT

Figure 1:
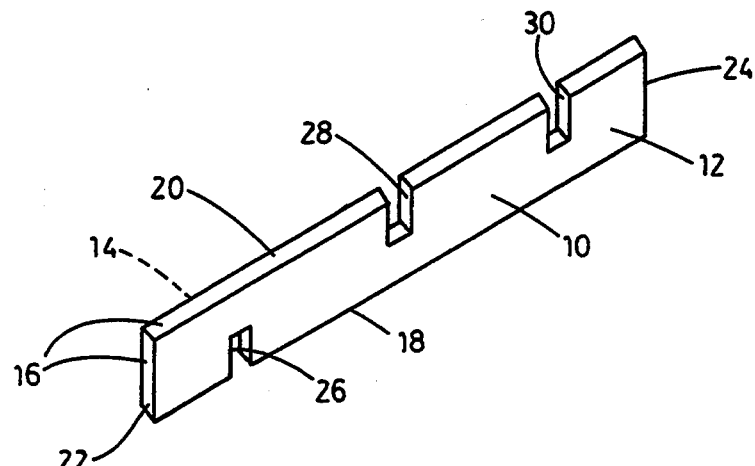
FIG. 1 is a perspective view of a panel used in association with the system for supporting and watering plant pots.

With reference to the drawings, a panel used in association with a system for supporting and watering plant pots is shown generally at 10 in FIG. 1. The panel 10 includes a first planar surface 12, a second planar surface 14 that opposes the first planar surface 12, and a rectangular boundary 16 about the planar surfaces 12 and 14 and which includes a first linear edge 18 and a second linear edge 20 which is parallel to the first linear edge 18, a third linear edge 22, and a fourth linear edge 24 which is parallel to the third linear edge 22. A first notch 26 extends inwardly from the first linear edge 18, and second and third notches 28 and 30, respectively, extend inwardly from the second linear edge 20. The notches 26, 28 and 30 are substantially uniformly sized such that notches from the panel 10 may be interfitted with notches from a like panel. The second notch 28 is located midway between the third and fourth linear edges 22 and 24 on the second linear edge 20; the first notch 26 is located between the second notch 28 and the third linear edge 22 on the first linear edge 18; and the third notch 30 is located between the second notch 28 and the fourth linear edge 24 on the second linear edge 20. The interfitting of a plurality of panels 10 results in the formation of a free-standing support 32, the support 32 being built by interlocking a desired number of panels 10 to create a pattern of panels 10 having interstices 34 therebetween. The interfitting of panels 10 is explained in greater detail below. The panel 10 is smooth and water-impervious and is formed of a flexible material and a suitable material for the panel 10 is a high density plastic such as polypropylene or polyethylene.

Figure 2:
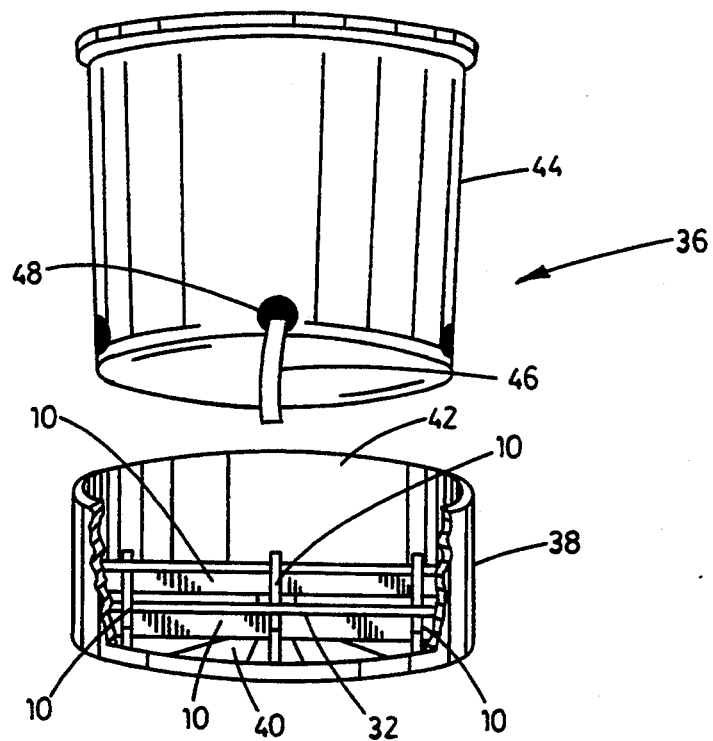
FIG. 2 is a view of the system for supporting and watering plant pots in which the container is cut away to show the free-standing support and the plant pot is exploded away from the container and the support.

FIG. 2 shows a system for supporting and watering plant pots at 36. The system 36 comprises a container 38 having a bottom wall 40 and a side wall 42 extending upwardly from the bottom wall 40, the container 38 holding water therein. System 36 further includes the free-standing support 32 which fits within the bottom wall 40 and the side wall 42 of the container 38. A plant pot 44 fits atop the free-standing support 32 such that the free-standing support 32 is positioned between the bottom wall 40 of the container 38 and the plant pot 44. A wick 46 extends between a drainage hole 48 in the plant pot 44 and one of the interstices 34 formed between the pattern of panels 10. As should be understood, a reservoir of standing water which is contained within the container 38 fills the area of the interstices 34. Capillary action conveys water through the wick 46 from between the interstices 34 to the plant pot 44 when the container 38 has been filled with water. The wick 46 fits through the pattern of interstices 34 without any interference with the capillary action of the water therethrough.

It is to be understood that the free-standing support 32 may be formed in a number of different configurations. FIGS. 2–6 show certain exemplary configurations which may be built by interfitting the notches from several of different panels 10, though it is not intended that the support 32 be limited to those which are depicted herein. The different configurations as herein shown may be used to support different sized plant pots 44 and to fit within different sized and shaped containers 38. Other configurations and sizes of free-standing supports 32 are possible. It has been found that the supports 32 created by the interlocking panels 10 are durable and provide a stable support for the plant pots 44 when filled with dirt and potted. The system 36 of the present invention further provides ease of access to check water levels contained within the container 38.

In FIG. 3, a panel 10A is interfitted with a panel 10B by mating notches 28 in each of the panels 10A and 10B together. In FIG. 4, the notches 26 and 30 of panel 10A are mated with similar notches in panel 10B. The configuration as represented in FIGS. 5, 6, 7 and 8 may be built up by interfitting the notches from a plurality of panels 10. The flexibility of the panels 10 aids in the assembly of the free-standing supports 32, and the panels 10 may even be in a flexed state when the support 32 has been built.

In the operation of the system 36, the free-standing support 32 is built up to accommodate the size and shape of both the container 38 and the plant pot 44. As explained earlier, the free-standing support 32 may be built up according to a number of configurations to accomplish this purpose. The support 32 is placed with the container 38 and the container 38 is filled with water such that the interstices 34 formed between the pattern of panels 10 have water therebetween. The plant pot 44 is placed atop the support 32 and the wick 46 is run between the plant pot 44 and one of the interstices 34 formed between the pattern of panels 10. The wick 46 is typically routed to the plant pot 44 through the drainage hole 48.

It is to be understood that the invention is not confined to the particular construction and arrangement as herein illustrated and described, but embraces such modified forms thereof as come within the scope of the following claims.

What is claimed is:

1. An apparatus for supporting and watering plant pots, comprising:

(a) a container having bottom and side walls for holding water;

(b) a free-standing support having a plurality of water-impervious narrowly rectangular panels, each of the panels having a first end, a second end, a midpoint, a longitudinal axis, a first planar surface, a second planar surface that opposes the first planar surface, and a boundary about the planar surfaces which includes a first linear edge and a second linear edge which is parallel to the first linear edge, and wherein the panel has a given length and width dimension and includes a first notch which extends inwardly from the first linear edge, and second and third notches which extend inwardly from the second linear edge, the first notch being disposed between the midpoint and the first end, the second notch being disposed substantially at the midpoint, and the third notch being disposed between the midpoint and the second end, and wherein the first, second and third notches are oriented substantially normally relative to the longitudinal axis, and wherein the notches are substantially uniformly sized such that one panel may be interfitted with another by mating notches from the different panels, and wherein the individual notches have a given length dimension which is not greater than one-half the width dimension of the panel, and a width dimension which is substantially uniform along its entire length, and wherein the support is built by interlocking a desired number of panels to create a pattern of panels having interstices therebetween, and wherein the support fits within the bottom and side walls of the container and further wherein the support is placed between the bottom wall of the container and the plant pot; and (c) a wick which extends between one of the interstices formed between the pattern of panels and the plant pot to convey water by capillary action to the plant pot when the container has been filled with water.

2. The system of claim 1 wherein the panels are made of a flexible material.

3. The system of claim 2 wherein the panels are made of a high density plastic.

4. The system of claim 3 wherein the high density plastic is polyethylene.

5. The system of claim 3 wherein the high density plastic is polypropylene.

6. A kit for supporting and watering plant pots, comprising:

(a) a container having bottom and side walls for holding water;

(b) a plurality of water-impervious narrowly rectangular panels, each of the panels having a first end, a second end, a midpoint, a longitudinal axis, a first planar surface, a second planar surface that opposes the first planar surface, and a boundary about the planar surfaces which includes a first linear edge and a second linear edge which is parallel to the first linear edge, and wherein the panel has a given length and width dimension and wherein the panels each includes a first notch which extends inwardly from the first linear edge, and second and third notches which extend inwardly from the second linear edge, the first notch being disposed between the midpoint and the first end, the second notch being disposed substantially at the midpoint, and the third notch being disposed between the midpoint and the second end, and wherein the first, second and third notches are oriented substantially normally relative to the longitudinal axis, and wherein the notches are substantially uniformly sized such that one panel may be interfitted with another by mating notches from the different panels, and wherein the individual notches have a given length dimension which is not greater than one-half the width dimension of the panel, and a width dimension which is substantially uniform along its entire length, and wherein a free-standing support may be built by interlocking a desired number of panels to create a pattern of panels having interstices therebetween, and wherein the support is adapted to fit within the bottom and side walls of the container and further wherein the support is adapted to be placed between the bottom wall of the container and the plant pot; and (c) a wick which extends between one of the interstices formed between the pattern of panels and the plant pot to convey water by capillary action to the plant pot when the container has been filled with water.

7. The system of claim 6 wherein the panels are made of high density plastic.

8. The system of claim 7 wherein the high density plastic is polypropylene.

9. The system of claim 7 wherein the high density plastic is polyethylene.

10. A free-standing support for a plant pot comprising a plurality of water-impervious narrowly rectangular panels, each of the panels having a first end, a second end, a midpoint, a longitudinal axis, a first planar surface, a second planar surface that opposes the first planar surface, and a boundary about the planar surfaces which includes a first linear edge and a second linear edge which is parallel to the first linear edge, and wherein the panel has a given length and width dimension, the panels each includes a first notch which extends inwardly from the first linear edge, and second and third notches which extend inwardly from the second linear edge, the first notch being disposed between the midpoint and the first end, the second notch being disposed substantially at the midpoint, and the third notch being disposed between the midpoint and the second end, and wherein the first, second and third notches are oriented substantially normally relative to the longitudinal axis, and wherein the notches are substantially uniformly sized such that one panel may be interfitted with another by mating notches from the different panels, and wherein the individual notches have a given length dimension which is not greater than one-half the width dimension of the panel, and a width dimension which is substantially uniform along its entire length, and wherein the support is built by interlocking a desired number of panels to create a pattern of panels having interstices therebetween, which is large enough to fit under the plant pot.

11. The system of claim 7 wherein the panels are made of high density plastic.

* * * * *